US012115122B2

(12) United States Patent
Greenhalgh

(10) Patent No.: US 12,115,122 B2
(45) Date of Patent: Oct. 15, 2024

(54) HANDS-FREE WALKING DEVICES AND METHODS

(71) Applicant: Scott Greenhalgh, Logan, UT (US)

(72) Inventor: Scott Greenhalgh, Logan, UT (US)

(73) Assignee: Utah State University, Logan, UT (US)

( * ) Notice: Subject to any disclaimer, the term of this patent is extended or adjusted under 35 U.S.C. 154(b) by 235 days.

(21) Appl. No.: 17/508,366

(22) Filed: Oct. 22, 2021

(65) Prior Publication Data

US 2022/0125663 A1 Apr. 28, 2022

Related U.S. Application Data

(60) Provisional application No. 63/104,171, filed on Oct. 22, 2020.

(51) Int. Cl.
*A61H 3/00* (2006.01)
*A61H 3/02* (2006.01)

(52) U.S. Cl.
CPC ..... *A61H 3/0288* (2013.01); *A61H 2003/007* (2013.01); *A61H 2003/0283* (2013.01); *A61H 2003/0294* (2013.01); *A61H 2201/1642* (2013.01); *A61H 2201/1652* (2013.01)

(58) Field of Classification Search
CPC .................... A61H 2003/005; A61H 2003/007
See application file for complete search history.

(56) References Cited

U.S. PATENT DOCUMENTS

| | | | | |
|---|---|---|---|---|
| 1,660,721 | A | 2/1928 | Schrag | |
| 4,058,119 | A | 11/1977 | Rosequist | |
| 5,178,595 | A | 1/1993 | MacGregor | |
| 9,271,892 | B1 * | 3/2016 | Bement | A61H 3/04 |
| 9,364,383 | B2 * | 6/2016 | Butler | A61H 3/00 |
| 9,375,377 | B1 | 6/2016 | Edwards | |
| 9,408,443 | B2 | 8/2016 | Hunter | |
| 9,808,392 | B2 | 11/2017 | Haider | |
| 2014/0114218 | A1 * | 4/2014 | Baugh | A61H 3/02 601/34 |
| 2016/0279014 | A1 | 9/2016 | Butler | |
| 2017/0312579 | A1 * | 11/2017 | Nakashima | A63B 21/4011 |

(Continued)

OTHER PUBLICATIONS

Forward Mobility, FreedomLeg, accessed Nov. 1, 2021, https://www.freedomleg.com/hands-free-crutch.

(Continued)

*Primary Examiner* — Noah Chandler Hawk
(74) *Attorney, Agent, or Firm* — Thorpe North & Western, LLP

(57) ABSTRACT

Hands-free walking devices and methods of constructing the same are described herein. The devices can include a receiving member to receive a portion of a patient's leg above a patient's knee and one or more hinges connected to the receiving member. One or more vertical members can be each connected to one of the hinges. A ground-contact member can be connected to the vertical members. The receiving member can transfer at least a portion of the patient's weight through the vertical members to the ground-contact member. The hinges can rotate about an axis about which the patient's knee also rotates while walking to support a natural gait.

23 Claims, 6 Drawing Sheets

(56) References Cited

U.S. PATENT DOCUMENTS

2019/0216627 A1 7/2019 Requa

OTHER PUBLICATIONS

Ergoactives, Ergobaum Ergonomic Pain Reducing Forearm Crutches (Pair), accessed Nov. 1, 2021, https://www.rehabmart.com/product/ergobaum-royal-ergonomic-forearm-crutch-40738.html.

Allimed, Inc., Freedom comfort Post-Op ROM Knee Brace, accessed Nov. 1, 2021, https://www.alimed.com/freedom-comfort-post-op-rom-knee-brace.html?pid=164047&gclid=Cj0KCQjwjrvpBRC0ARIsAFrFuV9QWGfERP-YbR3O3wYy1Pgq6X26K_qf3hlStXqhyEeaUPmroHVNvdwaAvgZEALw_wcB.

* cited by examiner

HANDS-FREE WALKING DEVICES AND METHODS

RELATED APPLICATION

This application claims the benefit of U.S. Provisional Patent Application Ser. No. 63/104,171 which was filed on Oct. 22, 2020, the contents of which are hereby incorporated by reference in their entirety.

BACKGROUND

The present disclosure relates to assistive rehabilitation devices and treatment methods for lower-leg injuries.

Many treatment plans for lower leg injuries include at least one period where the patient is required to limit or eliminate weight bearing with the injured lower leg. Traditional assistive devices used to mobilize patients during this period (such as crutches, wheelchairs, or knee scooters) place considerable limitations on the patient. For example, such devices typically occupy the patient's hands, prevent the patient from using stairs, and make sitting down uncomfortable or cumbersome for the patient. Additionally, such devices are almost never an option for patients who have sustained upper limb injuries in addition to their lower limb injuries. Recently, assistive hands-free crutch designs have given patients greater mobility, yet none of these designs allow the knee to articulate. The lack of articulation can make the transition from sitting to standing and vice versa difficult and can lead to muscle atrophy. Furthermore, some current hand-free crutch systems put pressure on the tibia and the knee, rendering them unusable for patients who have injuries to either of these areas.

Furthermore, many treatment plans include "transition periods" during which the patient is advised to bear a certain percentage of his or her weight on her or his injured leg. However, current assistive devices to do not provide any means of quantifying this proportion of weight. This forces the patient to make very rough estimates.

SUMMARY

A hands-free crutch systems can allow articulation of the knee and can be used by patients who have sustained injuries to the knee or tibia. Hands-free crutch systems can also quantify an amount of weight borne by an injured leg to help manage the transition from non-weight bearing to partial-weight bearing. Such devices can facilitate knee articulation to enable easier mobilization by a patient and to reduce muscle atrophy during treatment. Such devices can also provide a clear measure of progress during treatment and ensure that the injured leg is consistently bearing a healthy percentage of the patient's weight.

The technology of the present disclosure transfers the weight that would normally be borne by a patient's lower leg and foot to the patient's upper leg and thigh. This can allow the patient to bend or articulate the injured leg naturally to a certain degree. Such a device can also be configured to allow a variable, pre-determined quantity of weight to be borne by the patient's injured lower leg and/or foot while transferring the rest of the patient's weight to the upper thigh of the injured leg.

The ability of the patient to articulate the knee can improve his or her overall comfort level throughout the recovery process and can allow him or her to wear the device relatively comfortably while sitting. A device that allows the knee to articulate also improves the patient's travelling speed and facilitates relatively complex maneuvers as compared to standing or walking on a flat surface, such as navigating stairs and transitioning from sitting to standing. Such a device can positively impact recovery outcomes by reducing muscle atrophy, providing a smooth and quantified transition from non-weight-bearing to partial weight-bearing, and reducing recovery time.

Embodiments of the present disclosure can include, but are not limited to, a hands free walking device comprising a receiving member configured to receive a portion of a patient's leg above a patient's knee. In one example, at least one hinge can be connected to the receiving member and configured to articulate about an axis about which the patient's knee also rotates. In another example, at least two hinges can be connected to the receiving member where each hinge is configured to articulate about the axis. In some examples, each hinge can include multiple hinges to allow for complex movement, staged range of motion, etc. For example, each hinge in a multiple hinge configuration can be limited to a certain range of motion. This can allow for integration of a spring or damper resistance into the hinge where each hinge has a different rate allowing for a progressive spring. The device can also include at least one vertical member each connected to each of the at least one hinge. The device also includes a ground-contact member and a saddle. At least some of a patient's weight can be transferred from the receiving member through the hinge or hinges and the vertical member(s) to the ground-contact member in contact with the ground. The saddle can be positioned above the ground-contact member and can be configured to support the patient's foot. The saddle can also be configured to transfer at least a portion of the patient's weight through the two vertical members to the ground-contact member.

Embodiments of the present disclosure can also include a hands-free walking device comprising a receiving member configured to receive a portion of a patient's leg above a patient's knee. One or more hinges can be connected to the receiving member where each hinge or collection of hinges is configured to articulate about an axis about which the patient's knee also rotates. The device can also include one or more vertical members where each vertical member is connected to one of the one or more hinges. One or more dampers can also be used where each damper is connected to the receiving member and a corresponding vertical member. The device can further include a ground-contact member connected to the two vertical members and configured to contact the ground.

An optional saddle can also be connected to the one or more vertical members through a spring. At least some of a patient's weight can be transferred from the receiving member through the dampers and the vertical members to the ground-contact member in contact with the ground. The saddle can be positioned above the ground-contact member and configured to support a patient's foot. The saddle can be configured to transfer at least a portion of the patient's weight through the spring and the one or more vertical members to the ground-contact member.

Embodiments of the present disclosure can also include a method of constructing a hands-free walking device. The method can comprise configuring a receiving member to receive a portion of a patient's leg. Two hinges can be connected to the receiving member where each hinge is configured to articulate about an axis about which a patient's knee also rotates. A vertical member can be connected to each of the two hinges. Further, a damper can be connected to each vertical member, respectively, while also connecting each damper to the receiving member. A ground-contact member can also be connected to the vertical members. At least some of a patient's weight can be transferred from the receiving member through the dampers and the vertical members to the ground-contact member.

The method can also comprise determining an amount of weight to be borne by an injured portion of the patient's leg and configuring a saddle to support a patient's foot. The saddle can also be configured to transfer the amount of weight through at least one spring and the vertical members to the ground-contact member. The saddle can be positioned above the ground-contact member. A spring constant of the at least one spring can be proportional to the amount of weight transferred by the saddle.

Embodiments of the present disclosure can also include a hands-free walking device comprising a receiving member configured to receive a portion of a patient's leg above a patient's knee; two hinges connected to the receiving member, wherein each hinge is configured to articulate about an axis about which the patient's knee also rotates; two vertical members, wherein each vertical member is connected to one of the two hinges; at least two dampers, wherein each damper is connected to the receiving member and one of the two vertical members; a ground-contact member connected to the two vertical members and configured to contact the ground; and a saddle connected to the two vertical members, the saddle positioned above the ground-contact member. At least some of a patient's weight can be transferred from the receiving member through the dampers and the vertical members to the ground-contact member in contact with the ground. The saddle can be positioned above the ground-contact member and can be configured to support the patient's foot and transfer at least a portion of the patient's weight through the two vertical members to the ground-contact member.

BRIEF DESCRIPTION OF THE DRAWINGS

The foregoing features of the present disclosure will become more fully apparent from the following description and appended claims, taken in conjunction with the accompanying drawings. Understanding that these drawings depict only exemplary embodiments of the invention and are, therefore, not to be considered limiting of its scope, the technology of the present disclosure will be described with additional specificity and detail through use of the accompanying drawings in which:

Figure 1A:
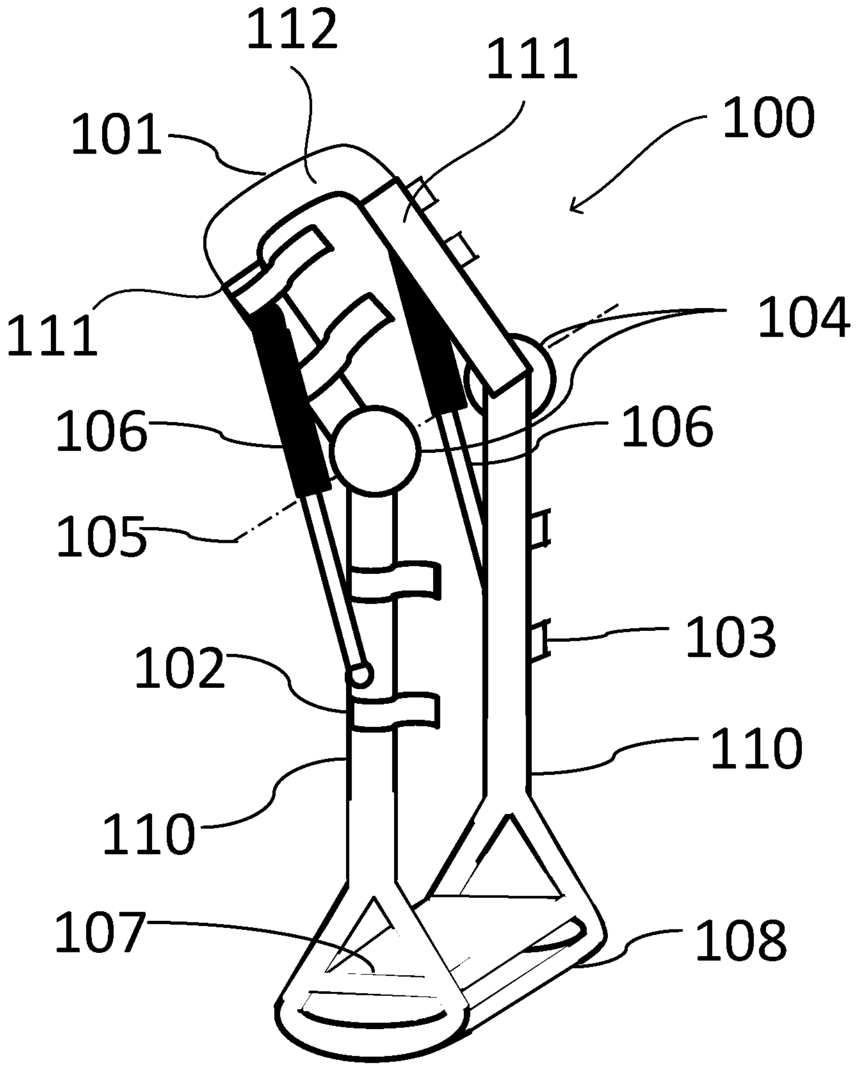
FIG. 1A illustrates a projected, angled view of an embodiment of a hands-free crutch.

Reference will now be made to the exemplary embodiments illustrated, and specific language will be used herein to describe the same. It will nevertheless be understood that no limitation of the scope of the invention is thereby intended.

DETAILED DESCRIPTION OF EMBODIMENTS

The present disclosure covers apparatuses and associated methods for hands-free crutches. In the following description, numerous specific details are provided for a thorough understanding of specific example embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the example embodiments. Furthermore, the described features, structures, or characteristics may be combined in any suitable manner in a variety of alternative embodiments.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional" or "optionally" or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

As used herein, the term "patient" can be used to refer to any user of a hands-free crutch device.

As used herein, the term "weight" can be used interchangeably with the term "mass" and should be assigned the same meaning generally assigned to the term "mass."

As used herein, the terms "brace" and "body" can be used interchangeably to refer to any receiving member configured to receive a portion of a patient's leg above the patient's knee and give support to that leg. Such a receiving member can comprise a support structure designed to fit around the portion of the patient's leg above the knee. Such a receiving member can also include soft materials, such as foam or cloth, to provide padding and comfort to the patient.

As referenced herein, the term "strap" can refer to any material configured to secure, fasten, or carry something, or to hold on to something. For example, a strap can refer to a flexible material that is configured to secure a portion of a user's leg to an embodiment of a hands-free crutch device in accordance with the present disclosure. A "strap" can further be a material that is configured to attach to or to incorporate a fastening device, such as one or more straps that incorporate respective sides of a hook-and-loop fastener or that attach to or connect with a buckle.

As referenced herein, the term "damper" can be used to refer to a device designed to absorb, counterbalance, or dissipate force or shock to any degree. This can be done, for example, by forcing hydraulic oil and/or pressurized gas through small holes as the device moves. A "damper" can include, but is not limited to, a gas shock, which can also be referred to as a "damped gas spring", or "gas damper." A damper could also be a hydraulic shock. Other dampers can include, but are not limited to, steel springs, rubber elastomers, and the like. Thus, in this disclosure, the terms "damper" and "shock" can be used interchangeably.

As referenced herein, the terms "spring" and "spring mechanism" can be used interchangeably to refer to any device that can be compressed, extended, or rotated but has a tendency or ability to return to its original shape when released. A "spring" can be any resilient device or resilient member. For example, a "spring" can include, but is not limited to, a helical metal coil, a resilient metal sheet, a leaf spring, or the like. A "spring" can also be a cord designed to extend to a certain degree with a tendency or ability to return to its original length when released. In other words, a spring can be a resilient cord, such as a bungee cord. A "spring" can also be a material including a foam and/or a rubber material.

As referenced herein, the term "spring constant" is interchangeable with the terms "spring coefficient" and "stiffness." These terms refer to the relationship between an applied force on a spring and the displacement that the force creates on the spring. In other words, the spring constant describes the relationship between a force applied to a spring mechanism and the extension, compression, or rotation of that spring mechanism from its equilibrium position. The "spring constant" can also refer to the extent to which the spring mechanism resists deformation in response to an applied force.

As used herein, the term "saddle" can refer to any device or material that is suitable for supporting at least a portion of a patient's foot. A saddle can contact at least a portion of a patient's foot. For example, the saddle can contact at least a portion of a sole of a patient's foot, such as the ball of a patient's foot. In some embodiments, a saddle can be a flat bar or platform constituting a portion of a hands-free walking device. In another example, the saddle can be a flexible strap. In one example, a saddle can be attached to a hands-free walking device through one or more springs.

Figure 1B:
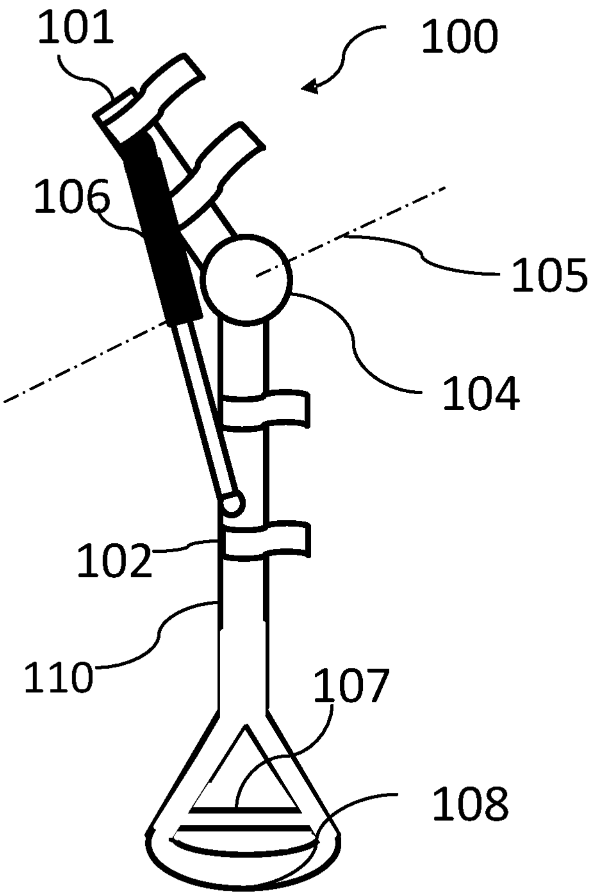
FIG. 1B illustrates a side view of the embodiment illustrated in FIG. 1A.

FIG. 1A illustrates an elevated, angled view of an embodiment of a hands-free walking device 100, and FIG. 1B is a side view of the hand-free walking device 100 shown in FIG. 1A. The device 100 can comprise a receiving member or body 101, one or more straps 102, one or more buckles 103, at least one hinge 104, at least one damper 106, a saddle 107, a ground-contact member 108, and at least one vertical member 110. In some examples, the walking device can include two hinges 104, two dampers 106, one saddle 107, and two vertical members 110.

The body 101 can be configured to receive a portion of a patient's leg above the patient's knee. For example, the body 101 can be configured to fit around a portion of a patient's leg above the patient's knee (i.e., at least a portion of a patient's upper leg). To this end, the body 101 can comprise one or more straps 102 attached to a longitudinal member 111 (e.g. a member that is configured to extend along at least a portion of a patient's upper leg) that can secure at least a portion of the patient's upper leg to the body 101. The straps 102 can fasten to a corresponding buckle 103 to secure the patient's leg to the body 101. The straps 102 can also secure the patient's leg to the body 101 via hook-and-loop fasteners. While this example is described with the straps 102 and buckles 103 to secure the patients leg to the body 101, this is not intended to be limiting. The straps 102 and buckles 103 are just examples of fasteners that can be used to secure the patient's leg to the body 101. Other suitable fasteners can also be used.

Alternatively, the body 101 can include a bar 112 that is configured to extend behind the patient's leg. The bar 112 can be formed integrally with the longitudinal member 111 or can be attached thereto. In the example shown in FIGS. 1A and 1B, the bar 112 can be a curved bar extending between two longitudinal members 111. In this example, the body 101 can have a U-shaped configuration. In some cases, the body can be substantially rigid.

Alternatively, the body can include an upper support strap which extends around the patient's leg at the upper thigh region instead of bar 112. In still another alternative, both a rigid bar 112 and the upper support strap can be used to provide support and flexibility.

A hinge 104 can be connected to the longitudinal member 111 of the body 101. The hinge 104 can connect the body 101 to a vertical member 110 in a rotatable manner. In the example shown in FIGS. 1A and 1B, two hinges 104 are attached to respective longitudinal members 111, and the longitudinal members 111 are attached to respective vertical members 110 via the hinges 104. Accordingly, in this example, the bar 112 can be configured to maintain a given distance between each of the two vertical members 110. The hinges 104 can be aligned with the knee of the patient's leg and can articulate along an axis 105 about which the patient's knee also rotates. The two hinges 104 can be configured to keep an angle between the body 101 and the vertical members 110 within a given range. For example, the given range can be less than or equal to the range of motion of the patient's knee (i.e. 10° to 180°) with a biased rest angle of about 150° to 180°. Optionally, one or both of the hinges and dampers can be adjustable to allow for the bias angle and the degree of dampening to be varied based on a user needs or preferences.

The ground-contact member 108 can be connected to the vertical member 110. For example, the ground-contact member 108 can be connected to each of the vertical members 110. The ground-contact member 108 can be positioned at the bottom of the device 100 where the device 100 makes contact with the ground. The device 100 can be configured such that the ground-contact member 108 makes contact with the ground as the patient walks, promoting a more natural gait. The ground-contact member 108 can be configured to contact the ground such that the device 100 supports at least some of the patient's weight. For example, at least some of the patient's weight is transferred from the body 101 through the dampers 106 and the vertical members 110 to the ground-contact member 108. Optionally, the ground contact member can include a lower ground contact surface which includes a non-slip surface. Such non-slip surfaces can include texture, rubberized layers, combinations thereof, and the like.

Although FIGS. 1A-3 illustrate a device 100 with dampers 106, embodiments of the present disclosure are not so limited. For example, in some embodiments, the device 100 can omit the dampers 106. Instead, the device 100 can transfer at least some of the patients weight from the body 101 through the hinges 104 and the vertical members 110 to the ground-contact member 108. In another alternative, the dampers 106 can be integrated into the hinge. For example, torsion springs may be integrated into a hinge to provide a resistance bias position for the hinge in an extended position. Regardless, when used, the dampers 106 can exert a biasing force on the hinge so as to flexibly maintain a bias position to reduce user fatigue and potential additional injury.

The saddle 107 can be connected to a vertical member 110. For example, the saddle 107 can be connected to each of the vertical members 110 and can be disposed between the vertical members 110. The saddle 107 can be positioned above the ground-contact member 108. The saddle 107 can be configured to support the patient's foot. In some configurations, the saddle can support at least a portion of the patient's weight. For example, the saddle can transfer a portion of the patient's weight from the saddle 107, through the two vertical members 110 to the ground-contact member 108.

In some configurations, the foot of the patient's injured leg can hover slightly above the saddle 107 or even omit the saddle. Regardless, in such cases a bottom of the foot can be spaced from 0.5 to 2 inches above the ground contact member 108. Hence, in some embodiments, the saddle 107 might not support any of the patient's weight.

The vertical members 110 can also attach to the user's leg, such as the lower leg between the foot and the knee. The vertical members 110 can be secured to the patient's leg through a number of straps 102. The straps 102 can include hook-and-loop fasteners or any other suitable mechanisms for fitting the straps 102 around the patient's leg. Each strap can have a corresponding buckle 103. The buckle 103 can be located on the opposite vertical member 110 across from where the strap 102 attaches to the vertical member 110.

The straps 102 on the body 101 and the vertical members 110 can be positioned to maintain alignment between the patient's knee and the hinges 104 while keeping the patient's weight off of the injured lower leg. Such hinges 104 can connect the body 101 to the vertical members 110 and allow the vertical members 110 to articulate with respect to the body 101. In other words, the hinges 104 can allow the device 100 to articulate with respect to an axis 105 (e.g., a horizontal axis). As a general rule, straps 102 above the knee can transfer weight into the longitudinal member(s) and the vertical member(s). Further, at least one strap adjacent the knee (i.e. within about 4 inches) can be sufficient to transfer weight. Straps oriented closer to the foot can generally maintain alignment of the foot with the device, rather than transfer substantial weight. Furthermore, one or more of the straps can be provided as compression sleeves (i.e. flexible and stretchable material formed as a sleeve).

Each damper 106 can be attached to a respective longitudinal member 111 at a point above the hinges 104 and to a respective vertical member 110 at a point below the hinges 104. The dampers 106 can help to achieve articulation of the knee while acting as stabilizers, thus allowing the user to walk smoothly. In some embodiments, an additional curved bar (not shown) can be coupled to the vertical members 110 and run around the back of the patient's calf to maintain stability and prevent two vertical members 110 from pinching in on the patient's leg.

The saddle 107 can be connected to the two vertical members 110 through a resilient member. In such embodiments, the saddle 107 can be configured to support a portion of the patient's weight through the resilient member. For example, a portion of the patient's weight can be transferred from the resilient member through the two vertical members 110 to the ground-contact member. The resilient member can be, but is not limited to, a foam insert. For example, one or more foam inserts can be positioned on top of the saddle 107. The foam insert can include polyurethane foam materials, such as polyester foam. The foam material can be compressible, elastic, and resilient. In other words, the foam material can have a tendency to absorb energy when deformed and to attempt to return back to its equilibrium position.

In some embodiments, each foam insert can be part of a set of foam inserts, wherein each foam insert in the set has a unique degree of stiffness. In such embodiments, switching the foam insert with another insert of the same set can decrease or increase the portion of the patient's weight supported by the saddle 107. The portion of the patient's weight supported by the saddle can be determined based on portion of the patient's weight to be borne by the foot of the patient's leg in accordance with a rehabilitation plan. A rehabilitation plan can be designed by a doctor, physical therapist, and/or the patient. A rehabilitation plan can include, for example, a first stage of ten percent weight-bearing, a second stage of fifty percent weight-bearing, and a third stage of seventy-five percent weight-bearing. In such an example, if the patient's total weight is one hundred pounds, a foam insert can be selected for the first stage such that the portion borne by the patient's foot is equivalent to ten pounds. A second foam insert can be selected for the second stage such that the portion borne by the patient's foot is equivalent to fifty pounds, and a third foam insert can be selected for the final stage such that the portion borne by the patient's foot is equivalent to seventy-five pounds. Each selected foam insert can have a different degree of stiffness than the other foam inserts in the set, wherein the stiffness of each foam insert is proportional to the amount of weight designed to be borne by the patient's foot at that stage. The relationship between the stiffness of the foam insert and the weight to be borne can be similar to the relationship described in connection with FIG. 4, as will be described in more detail below.

Figure 2A:
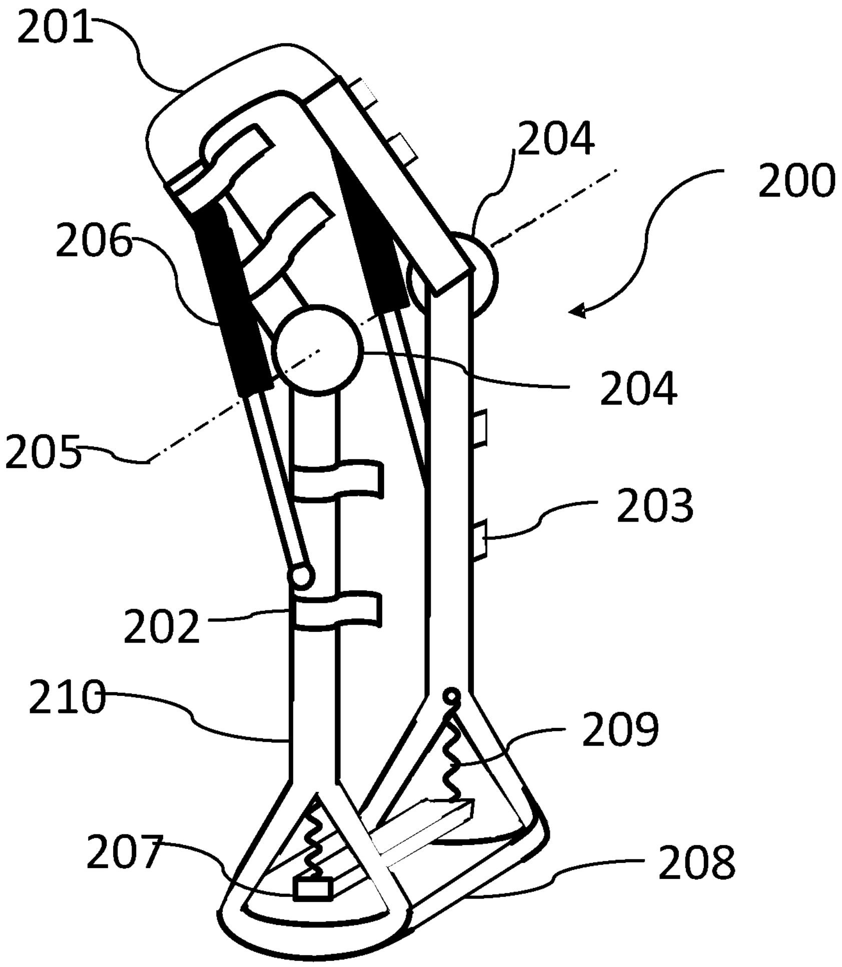
FIG. 2A illustrates a projected, angled view of an embodiment of a hands-free crutch with one or more springs.
Figure 2B:
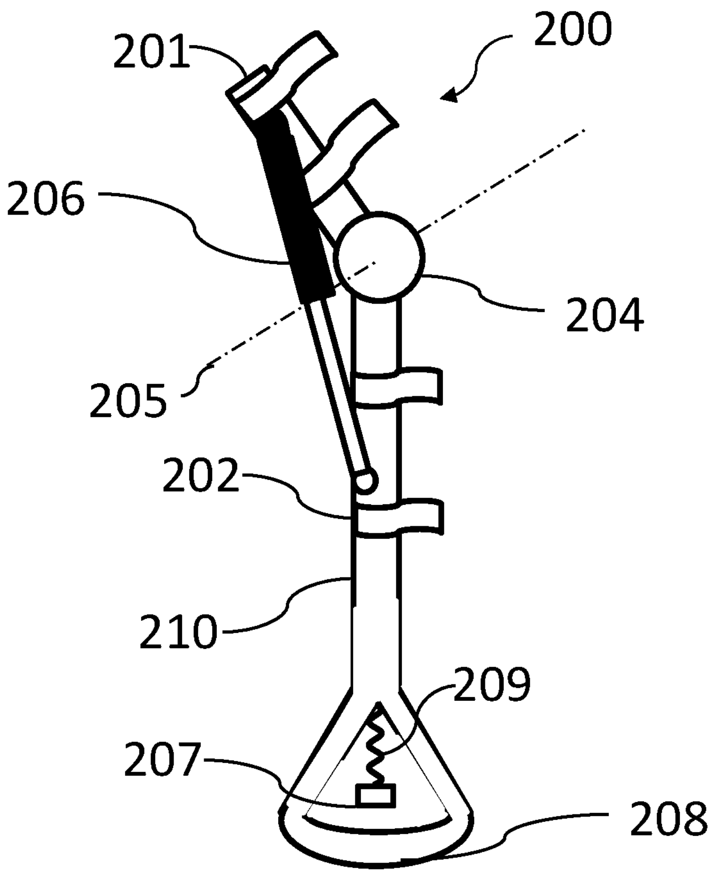
FIG. 2B illustrates a side view of the embodiment illustrated in FIG. 2A.

FIG. 2A illustrates an elevated, angled view of an embodiment of a device 200 (e.g., a hands-free walking device), and FIG. 2B illustrates a side view of the device 200. The device 200 can include a receiving member or body 201, one or more straps 202, one or more buckles 203, one or more hinges 204 designed to rotate around an axis 205, one or more dampers 206, a saddle 207, a ground-contact member 208, one or more springs 209, and at least one vertical members 210.

In this embodiment, the saddle 207 can be coupled to one or both of the vertical members 210 through one or more springs 209. The saddle 207 can be configured to support a portion of the patient's weight. For example, the saddle 207 is configured to transfer at least a portion of the patient's weight through the one or more springs 209 and one or both vertical members 210 to the ground-contact member 208. The springs 209 can be configured such that, as the patient walks, part of the patient's weight is transferred onto the saddle 207. As a result, the springs 209 allow the injured portion of the user's leg to bear a portion of the user's weight while the rest of the weight is borne through the device 200 by the user's upper thigh. The portion of the patient's weight borne by the injured portion of the user's leg is dependent on the stiffness of the springs 209. Thus, the portion of the user's weight to be borne by the injured portion of the leg can be adjusted by replacing the springs 209 with springs of the appropriate stiffness. The springs 209 can be configured such that they can be easily attached to and detached from the device 200 to be replaced with springs 209 of different stiffnesses.

The device 200 can be configured such that the injured portion of the patient's leg bears a pre-determined percentage of the patient's weight by selecting springs 209 of the appropriate stiffness. The stiffness of the springs 209 can be proportional to the portion of the patient's weight to be borne by the patient's injured leg. Determining the appropriate stiffness can be accomplished using the method described in FIG. 4, as will be discussed in more detail below.

Figure 3:
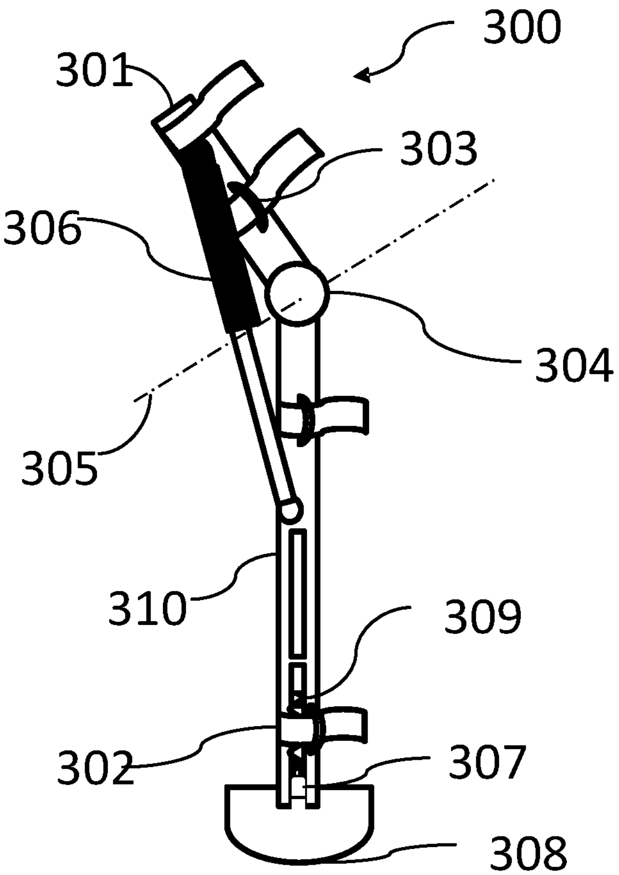
FIG. 3 illustrates a side view of an embodiment of hands-free crutch with one or more springs.

FIG. 3 illustrates a side view of an embodiment of a device 300 (e.g., a hands-free walking device). The device 300 can include a receiving member or body 301, one or more straps 302, one or more buckles 303, one or more hinges 304 designed to rotate around an axis 305, one or more dampers 306 (e.g., shock absorbers), a saddle 307, a ground-contact member 308, and one or more springs 309.

In some embodiments, the saddle 307 can be coupled to the vertical members 310 through one or more springs 309. The springs 309 can be one or more bungee cords or any other type of cord that can be compressed or extended with a tendency to return to its original shape and length when released. The ideal stiffness, or spring constant, of the springs 309 can be determined using the method described in connection with FIG. 4 discussed below.

The one or more springs 309 can be coupled to the saddle 307. Thus, the saddle 307 can be free to move up and down along a vertical axis of the device 300 as the patient walks.

Figure 4:
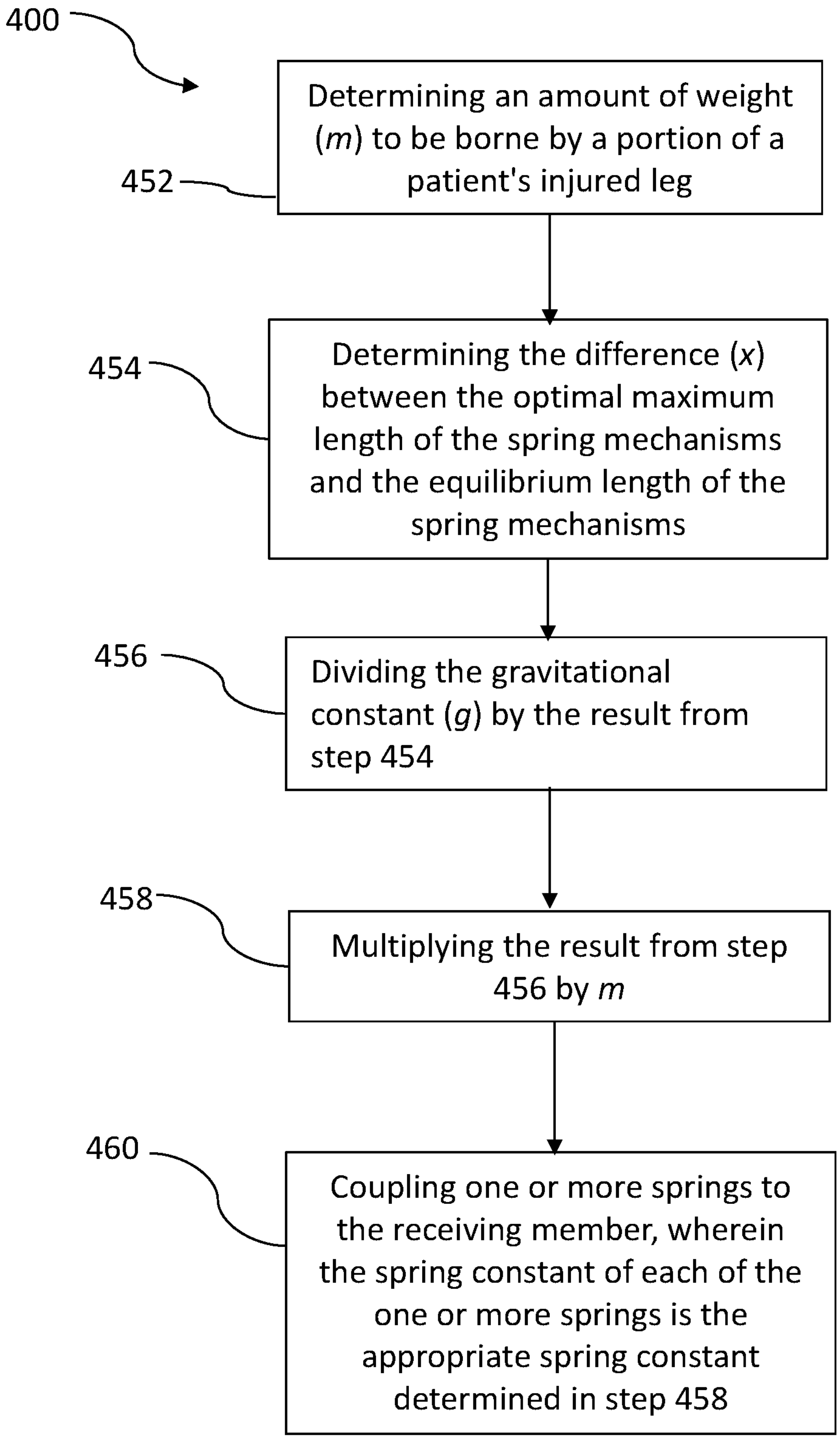
FIG. 4 illustrates a method of configuring a hands-free crutch such that a specified amount of weight is borne by a patient's injured leg.

FIG. 4 illustrates a method 400 of configuring a hands-free walking device (e.g., devices 100, 200, and 300 of FIGS. 1, 2, and 3, respectively) such that a specified amount of weight is borne by a patient's injured leg.

A commonly-understood principle of physics holds that the force F used to extend a spring is directly proportional to the distance x from the spring's equilibrium that it is extended:

$$F=kx \tag{1}$$

This principle is known as "Hooke's Law." Here, "k" represents the spring constant, or stiffness, of a spring (such as springs 209 and 309 described above). According to Newton's Second Law of Motion, the force F can be expressed as a product of mass (m) and acceleration (g), as follows:

$$F=ma. \tag{2}$$

Substituting equation (1) for equation (2) yields the following result:

$$kx=ma. \tag{3}$$

Here, m can represent the mass to be borne by the patient's injured leg. The rate of acceleration (a) of that mass towards the ground is equal to the gravitational constant ($g=9.8\ m/s^2$), or the rate at which all masses in the Earth's atmosphere accelerate towards the Earth. Hence, equation (3) can be re-arranged to express the spring constant (k) needed to allow the user's leg to bear a certain mass (m):

$$k=m\left[\frac{g}{x}\right] \tag{4}$$

The mass (m) represents the mass (in kilograms) intended to be borne by the patient's injured leg. Configuring a hands-free crutch such that a specified amount of weight is borne by a patient's injured leg involves first determining an amount of weight (m) to be borne by the portion of the patient's injured leg in step 452. This can be determined by a doctor as part of the patient's treatment plan. Some considerations used to make such a determination can include, but are not limited to: overall patient weight, patient strength, time since injury, weight successfully borne during a previous stage of the treatment plan, and recovery goals.

In Equation 4, x is a distance value representing the change in the length of the springs (e.g., springs 209) from their equilibrium (non-extended) positions. The change in length of the springs 209 can be determined by length of the patient's leg at full extension. For example, if the patient's foot applied to the saddle 207 causes the springs 209 to have a length of 5 inches, and if the length of the springs 209 at their equilibrium position were 3 inches, x would be equal to 2 inches. Based on this, an optimal maximum length (the change in length of the springs 209 from equilibrium at full extension) of the springs 209 can be determined by the length of the springs 209 at full extension (i.e. when force F is applied) in step 454. The optimal maximum length can be a length that provides for the greatest degree of comfort and/or functionality for a patient. The optimal maximum length may not exceed the distance between the upper attachment point of the springs 209 and the ground-contact member 208.

After the difference (x) between the optimal maximum length of the springs and the equilibrium length of the springs is determined in step 454, the optimal spring constant (k) can be determined by substituting the known values of m and x into equation (4). This involves dividing the gravitational constant (g) by the result from step 454 (x) in step 456 and multiplying the result from step 456 by m in step 458, or the result from step 452. Finally, the process involves coupling one or more springs to the receiving member in step 460, wherein the spring constant of each of the one or more springs it he appropriate spring constant (k) determined in step 458. For example, if the treatment plan for a patient weighing 60 kg required the patient to bear fifty percent of their weight on the injured leg, equation (4) would yield an optimal spring constant of 147 N/m. Thus, springs 209 with a spring constant of approximately 147 N/m would be selected.

As such, a method of constructing a hands-free walking device in accordance with the present disclosure can include, but is not limited to, configuring a receiving member (e.g. body or brace) to receive a portion of a patient's leg (e.g., a portion of a patient's leg above the patient's knee), connecting two hinges to the receiving member, connecting a vertical member to each of the two hinges, connecting at least two dampers to the receiving member and to the vertical members, and connecting a ground-contact member to the two vertical members. Each hinge can be configured to articulate along an axis about which the hinges also rotate.

The method can further comprise determining an amount of the patient's weight to be borne exclusively by the hands-free walking device based on a rehabilitation plan for the patient. The ground-contact member can be configured to contact the ground, and the amount of the patient's weight to be borne exclusively by the hand's free walking device is transferred from the receiving member (e.g. body or brace) through the dampers and the vertical members to the ground-contact member. The method can further include configuring a saddle to support the patient's foot, thereby causing an injured portion of the patient's leg to bear at least a portion of the patient's weight based on the rehabilitation plan for the patient. The portion of the patient's weight to be borne by the injured portion of the patient's leg can be equivalent to the difference between the patient's total weight and the amount of the patient's weight borne exclusively by the hands-free walking device. The saddle can be positioned above the ground-contact member. A spring constant (k) of each spring of the number of springs can be proportional to the portion of the patient's weight borne by the injured portion of the patient's leg. Each spring can be coupled to the saddle and the ground-contact member or one of the vertical members such that it can easily be detached and replaced. The portion of the patient's weight borne by the injured portion of the patient's leg is transferred from the saddle through the springs and the vertical members to the ground-contact member.

As described above, the rehabilitation plan can include one or more stages of recovery. The portion of the patient's weight to be borne by the patient's foot can be determined by the appropriate stage of recovery.

It will be appreciated that several of the above-disclosed and other features and functions, or alternatives thereof, can be desirably combined into many other different systems or applications. Also, various presently unforeseen or unanticipated alternatives, modifications, variations or improvements therein can be subsequently made by those skilled in the art, and are also intended to be encompassed by the following claims.

The present invention can be embodied in other specific forms without departing from its spirit or essential characteristics. The described embodiments are to be considered in all respects only as illustrative, and not restrictive. All changes which come within the meaning and range of equivalency of the foregoing description are to be embraced within the scope of the invention.

What is claimed is:

1. A hands-free walking device, comprising:
- a receiving member configured to receive a portion of a patient's leg above a patient's knee;
- one or more hinges connected to the receiving member, wherein each hinge is configured to articulate about an axis about which the patient's knee also rotates;
- one or more vertical members, wherein each vertical member is connected to one of the one or more hinges;
- a ground-contact member connected to the one or more vertical members and configured to contact the ground, wherein at least a portion of a patient's weight is transferred from the receiving member through the one or more hinges and the one or more vertical members to the ground-contact member in contact with the ground such that:
  - a patient's foot is oriented and spaced above the ground-contact member during the patient's use of the hands-free walking device; and
  - the patient's lower leg remains parallel to the one or more vertical members during the patient's use of the hands-free walking device;
- a saddle connected to the one or more vertical members, the saddle positioned above the ground-contact member and configured to support the patient's foot; and
- a resilient member connected to the saddle, wherein the saddle is configured to transfer at least some of the patient's weight through the one or more vertical members and the resilient member to the ground-contact member.

2. The device of claim 1, wherein the one or more hinges are configured to maintain an angle between the receiving member and the one or more vertical members within a given range.

3. The device of claim 2, wherein the given range is equal to a range of motion of the patient's knee.

4. The device of claim 1, wherein the one or more hinges includes at least two hinges and the one or more vertical members includes at least two vertical members where at least one hinge is attached to each of the at least two vertical members.

5. The device of claim 4, further comprising a bar extending behind the patient's leg and configured to maintain a given distance between each of the at least two vertical members.

6. The device of claim 1, wherein the resilient member comprises a foam insert.

7. The device of claim 6, wherein the foam insert comprises multiple foam inserts, each with varying stiffness configured to increase or decrease the amount of the at least some of the patient's weight transferred by the saddle.

8. The device of claim 1, wherein the resilient member comprises a spring.

9. The device of claim 8, wherein the spring has a spring constant that is proportional to the at least some of the patient's weight transferred by the saddle.

10. The device of claim 1, wherein the at least a portion of the patient's weight is determined based on an amount of the patient's weight to be borne by the patient's foot of in accordance with a rehabilitation plan.

11. The device of claim 1, further comprising one or more fasteners configured to secure the patient's leg to the hands-free device.

12. The device of claim 11, wherein the one or more fasteners are straps or sleeves.

13. The device of claim 1, wherein the resilient member is configurable to increase or decrease the at least some of the patient's weight transferred by the saddle.

14. The device of claim 1, further comprising one or more dampers, wherein each damper is connected to the receiving member and one of the one or more vertical members and at least some of the patient's weight is transferred from the receiving member through the one or more dampers.

15. The device of claim 14, wherein each damper includes a first end attached to a first point above the one or more hinges and a second end attached to a second point below the one or more hinges.

16. The device of claim 1, further comprising at least one spring coupled to the saddle and one or more of the vertical members, wherein the at least one spring is replaceable.

17. A method of constructing a hands-free walking device, comprising:
- configuring a receiving member to receive a portion of a patient's leg above the patient's knee;
- connecting one or more hinges to the receiving member, wherein each hinge is configured to articulate about an axis about which a patient's knee also rotates;
- connecting one or more vertical members to each of the one or more hinges;
- connecting a damper to each vertical member, respectively, and connecting each damper to the receiving member;
- connecting a ground-contact member to the vertical members wherein at least some of a patient's weight is transferred from the receiving member through the dampers and the vertical members to the ground-contact member such that:
  - a patient's foot is oriented and spaced above the ground-contact member during the patient's use of the hands-free walking device; and
  - the patient's lower leg remains parallel to the one or more vertical members during the patient's use of the hands-free walking device;
- determining an amount of weight to be borne by an injured portion of the patient's leg; and
- configuring a saddle to support a patient's foot and transfer the amount of weight through at least one resilient member and the vertical members to the ground-contact member, wherein:
  - the saddle is positioned above the ground-contact member, and
  - a spring constant of the at least one resilient member is proportional to the amount of weight transferred by the saddle.

18. The method of claim 17, further comprising coupling at least one spring to the saddle and one or more of the vertical members, wherein the at least one spring is replaceable.

19. The method of claim 18, wherein the at least one spring comprises a helical metal coil and a resilient cord.

20. The method of claim 17, wherein connecting the dampers further comprising:

attaching a first end of a first damper to a first point on the receiving member above a first hinge of the one or more hinges;

attaching a second end of the first damper to a second point on a first vertical member of the one or more vertical members below the first hinge.

21. The method of claim 17, wherein a rehabilitation plan includes one or more stages of recovery, and wherein the amount of weight is determined by a corresponding stage of recovery.

22. The method of claim 17, further comprising coupling one or more fasteners to the receiving member and coupling one or more fasteners to the one or more vertical members.

23. The method of claim 17, wherein the dampers comprise at least one of a gas shock absorber, a hydraulic shock absorber, a metal spring, and a rubber elastomer.

* * * * *